US007624342B2

(12) United States Patent
Matveyenko et al.

(10) Patent No.: US 7,624,342 B2
(45) Date of Patent: Nov. 24, 2009

(54) REMOTE WEB SITE EDITING IN A WEB BROWSER WITHOUT EXTERNAL CLIENT SOFTWARE

(75) Inventors: Wade A. Matveyenko, Kirkland, WA (US); Bryan Benson, Bow, WA (US); Stella Uyeno, Bellefonte, PA (US); Brian T. Worsham, Maple Valley, WA (US); Rajan Krishnamurty, Bellevue, WA (US)

(73) Assignee: The Cobalt Group, Inc., Seattle, WA (US)

( * ) Notice: Subject to any disclaimer, the term of this patent is extended or adjusted under 35 U.S.C. 154(b) by 550 days.

(21) Appl. No.: 11/149,909

(22) Filed: Jun. 10, 2005

(65) Prior Publication Data

US 2005/0229101 A1 Oct. 13, 2005

Related U.S. Application Data

(62) Division of application No. 10/351,465, filed on Jan. 24, 2003, now Pat. No. 7,000,184.

(51) Int. Cl.
*G06F 17/00* (2006.01)

(52) U.S. Cl. .................................................. 715/255

(58) Field of Classification Search ................ 715/200, 715/243, 255, 838
See application file for complete search history.

(56) References Cited

U.S. PATENT DOCUMENTS

| | | | |
|---|---|---|---|
| 6,785,864 B1* | 8/2004 | Te et al. ...................... | 715/205 |
| 6,826,594 B1* | 11/2004 | Pettersen .................... | 709/203 |
| 6,990,629 B1* | 1/2006 | Heaney et al. .............. | 715/200 |
| 7,152,207 B1* | 12/2006 | Underwood et al. ........ | 715/207 |
| 7,322,007 B2* | 1/2008 | Schowtka et al. ........... | 715/234 |
| 7,401,289 B2* | 7/2008 | Lachhwani et al. ......... | 715/243 |
| 7,536,641 B2* | 5/2009 | Rosenstein et al. .......... | 715/234 |
| 2001/0054049 A1* | 12/2001 | Maeda et al. ................ | 707/517 |
| 2002/0023111 A1* | 2/2002 | Arora et al. .................. | 707/513 |
| 2002/0032701 A1* | 3/2002 | Gao et al. .................... | 707/513 |
| 2002/0042738 A1* | 4/2002 | Srinivasan et al. ............ | 705/14 |
| 2002/0046245 A1* | 4/2002 | Hillar et al. ................. | 709/205 |
| 2002/0116418 A1* | 8/2002 | Lachhwani et al. ......... | 707/517 |
| 2002/0129054 A1* | 9/2002 | Ferguson et al. ............ | 707/503 |
| 2002/0138331 A1* | 9/2002 | Hosea et al. .................. | 705/10 |
| 2003/0023632 A1* | 1/2003 | Ries et al. .................... | 707/513 |
| 2003/0051022 A1* | 3/2003 | Sogabe et al. ............... | 709/223 |
| 2003/0069790 A1* | 4/2003 | Kane ........................... | 705/14 |

(Continued)

OTHER PUBLICATIONS

Milic-Frayling et al., SmartView: Enhanced Document Viewer for Mobile Devices, Google Nov. 15, 2002, pp. 1-11.*

(Continued)

*Primary Examiner*—Cong-Lac Huynh
(74) *Attorney, Agent, or Firm*—John R. Thompson; Stoel Rives LLP

(57) ABSTRACT

A visual WYSIWYG method of editing a web site in a remote user's client web browser without employing any external code on the user's computer, including designating an editable feature in a web page and responding to a request from the user's web browser to edit the web page. The response includes downloading the requested web page in an editable form which allows the user to edit the web page in the browser. The web browser then submits an identifier of the web site, a version of the web site, an identifier of the web page edited, an identifier of an editable feature, and indicia of a new selection for the identified editable feature. The web site stored on the server is then updated to incorporate the new selection for the editable feature. The revised web page is then downloaded to the user's web browser.

20 Claims, 13 Drawing Sheets

U.S. PATENT DOCUMENTS

| | | | |
|---|---|---|---|
| 2003/0225853 A1* | 12/2003 | Wang et al. | 709/217 |
| 2004/0148342 A1* | 7/2004 | Cotte | 709/203 |
| 2004/0156020 A1* | 8/2004 | Edwards | 351/209 |
| 2004/0163047 A1* | 8/2004 | Nagahara et al. | 715/517 |
| 2004/0255233 A1* | 12/2004 | Croney et al. | 715/500 |
| 2004/0268225 A1* | 12/2004 | Walsh et al. | 715/501.1 |
| 2004/0268232 A1* | 12/2004 | Tunning | 715/513 |
| 2005/0108637 A1* | 5/2005 | Sahota et al. | 715/526 |
| 2005/0114764 A1* | 5/2005 | Gudenkauf et al. | 715/517 |
| 2005/0171836 A1* | 8/2005 | Leacy | 705/14 |
| 2006/0031811 A1* | 2/2006 | Ernst et al. | 717/100 |
| 2006/0064637 A1* | 3/2006 | Rechterman et al. | 715/530 |
| 2006/0123330 A1* | 6/2006 | Horiuchi et al. | 715/500 |
| 2006/0129982 A1* | 6/2006 | Doyle | 717/115 |
| 2006/0161841 A1* | 7/2006 | Horiuchi et al. | 715/513 |
| 2006/0200751 A1* | 9/2006 | Underwood et al. | 715/501.1 |
| 2006/0248442 A1* | 11/2006 | Rosenstein et al. | 715/501.1 |
| 2006/0271844 A1* | 11/2006 | Suklikar et al. | 715/513 |
| 2006/0277588 A1* | 12/2006 | Harrington et al. | 725/135 |
| 2007/0053513 A1* | 3/2007 | Hoffberg | 380/201 |
| 2007/0271389 A1* | 11/2007 | Joshi et al. | 709/231 |
| 2008/0015929 A1* | 1/2008 | Koeppel et al. | 705/10 |
| 2008/0195932 A1* | 8/2008 | Oikawa et al. | 715/234 |
| 2009/0024918 A1* | 1/2009 | Silverbrook et al. | 715/255 |

OTHER PUBLICATIONS

Hogue et al., Thresher: Automating the Unwrapping of Semantic Content from the World Wide Web, ACM 2005, pp. 86-95.*

Housel et al., WebExpress: A Client/Intercept Based System for Optimizing Web Browsing in a Wireless Environment, Google 1998, pp. 419-431.*

Aloisio et al., Web-based access to the Grid using the Grid Resource Broker Portal, Google 2002, pp. 1145-1160.*

* cited by examiner

FIG. 2

| |
|---|
| Site ID = 2a00b |
| Version = 0020 [WIP] |
| Cell ID = 00A6 |
| Text = "This is the long-anticipated 6-speed Roadster model" |
| OldText = "This is the Roadster model" |

FIG. 10

REMOTE WEB SITE EDITING IN A WEB BROWSER WITHOUT EXTERNAL CLIENT SOFTWARE

RELATED APPLICATION

This is a divisional application of U.S. application Ser. No. 10/351,465, filed Jan. 24, 2003, now U.S. Pat. No. 7,000,184, issued Feb. 14, 2006, which is incorporated herein by reference.

COPYRIGHT NOTICE

© 2005 The Cobalt Group. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This application pertains to the World Wide Web (hereinafter "the Web") and, more specifically, it is directed to methods and systems to enable remote or client-side visual editing of web pages, commonly referred to as "what you see is what you get" or WYSIWYG (pronounced "wiz-ee-wig") editing, within a web browser application without installing any external software.

BACKGROUND OF THE INVENTION

The "Web" is now well developed and literally millions of Web sites have been deployed, hosted on various servers around the world. Web sites comprises one or more related "pages," in some cases extending to scores or even hundreds of pages. The subject matter of web sites spans the full range of human interests and endeavors, and many web pages now include dynamic content as well as multi-media content such as audio and video clips, slideshows and the like.

The creation and maintenance of web sites, especially sophisticated sites, requires appropriate software "tools". In the simplest case, a page designer who is skilled in the use of a known page "markup language" such as HTML can use almost any text editor to create a web page. More specifically, the designer creates an HTML file that defines the desired page layout and content. The page file is stored, often together with other, related page files, in a file system coupled to a web server that is arranged for "hosting" the corresponding site (and potentially other sites as well). When a user "visits" the site, by navigating a web browser to the corresponding address or URL, he can download and view the page (or, the "home page" will simply download automatically when accessed). Typically, the web browser is a program running on the user's computer (or other web-enabled device such as a cell phone). A standard web browser, such as Microsoft's Internet Explorer or Netscape, contains code for interpreting the HTML page and displaying the page. This is a simplified summary as the topic is well known.

Most web sites today are created and maintained using editors better suited to the task than an ordinary text editor or word processor. For example, an HTML editor can specially mark HTML "tags" and enforce compliance with HTML (or other markup language) standards. Some HTML or web page editors will provide several screen displays or "views" for the convenience of the designer, such an a code window showing the HTML code, and a "preview" or browser window showing how the web page will appear when the present code is processed in a web browser. These two views might be available side by side for showing the page designer the effects of various code changes in near-real time. Known web page editors typically also include file "browsing" features for storing and fetching content files for inclusion in a page under construction.

Known web site editors fall into several broad categories. First, there are "full blown" or standalone application programs for building web sites. Popular examples include Macromedia's "Dreamweaver" and Microsoft's "Front Page." Many of these products provide extensive "visual editing," which refers to designing a web page using "point and click" or "drag and drop" interfaces that enable selection of layouts and design styles and elements without writing code. The editor generates the code, such as HTML, that will implement the desired page design. Such programs may include various predetermined design "templates" to give the novice designer a "head start". Standalone web page editors, however, are bulky applications, typically they cost money, and they require installation in a compatible computer to use them. A "compatible" computer here refers to one that runs the operating system on which the editor application was designed to run (and meets other system requirements such as available memory and processor specifications). Standalone editors also require that the user upload or "publish" the completed web page to a server when it is ready for use on the Web (sometimes called "going live").

A second class of web site (or page) editor are those that run in a web browser. These are typically implemented as "plug-ins" i.e., code that is installed to supplement the web browser's native capability. Usually, plug-ins are acquired by download (via the Web) and then installed on the user's machine. One such plug-in editor is called "eWebEdit". Once installed, it can be used to create or edit HTML code in a web browser, and then display the resulting web page. While this approach avoids acquiring and installing a complete, standalone web editor application, it still requires a software download, which can be time consuming if the user has a low-bandwidth connection.

Some web editors are implemented as Java applets that are downloaded to a user's web browser. Like the use of plug-ins, this technique requires downloading software (although "installation" may be transparent), which can cause annoying delay especially where the user has a slow connection. Finally, there are web editors deployed on a server for remote client-server operation. These of course impose a traffic burden on the network and may not be suitable for numerous users.

What is needed is a way to allow remote users to edit a web page (or entire site) maintained on a web server without requiring each user to acquire and install web editing software. Put another way, any web user (with permission) using virtually any computer should be able to edit a web page without having to download or otherwise install special web editing software.

BRIEF DESCRIPTION OF THE DRAWINGS

FIG. 2 is an example of a form payload for submission to a web server in connection with remote editing of a web page in accordance with the present invention.

FIG. 10 is another example of a web browser window displaying a web site manager generated screen enabling an authorized user to select a cell for editing.

DETAILED DESCRIPTION OF PREFERRED EMBODIMENTS

Figure 1:
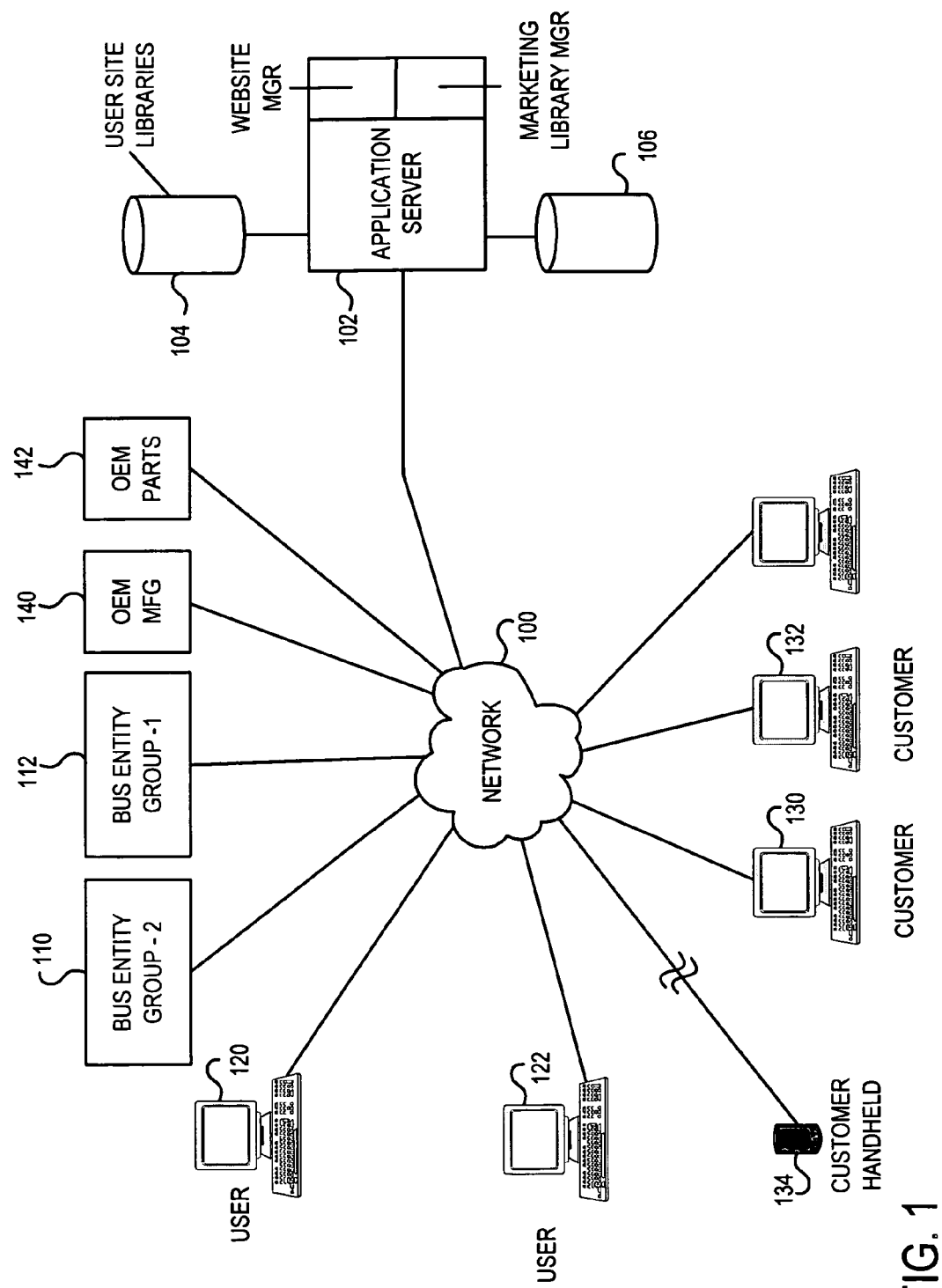
FIG. 1 is a simplified block diagram of various server and client entities each having access to a network for communications among them.

FIG. 1 is a block diagram of one example of a business application context in which the present invention can be used. The various entities illustrated in FIG. 1, further described below, can communicate on the network 100. This broadly represents any wired or wireless network such as a LAN, WAN or the Internet. On the right side an application server 102 provides services, such as web site hosting, as further described later. The application server 102 has access to database 104 for storing user web site libraries and to a second database 106 which can contain, for example, a library of marketing content available for use in various web pages.

In general, the application server 102 provides web site creation, maintenance and hosting services for one or more business entity groups, 110, 112. We will use the automobile industry as one example to illustrate a potential application of the present invention. The invention can be used, however, for user editing of any web page in virtually any environment, as further explained later. Continuing our automotive example, the business entity group 112 might be an automobile dealership or a group of automobile dealerships that maintains one or more web sites on the application server 102. Let us assume, for example, that business entity group 110 is an individual automobile dealership. An authorized individual at the dealership, for example a general manager, can use a PC, for example, to communicate via network 100 with the application server 102 to view the dealership's web site and to exercise high-level controls, for example setting permissions for which employees are authorized to edit the web site.

Continuing our example with the automobile dealership entity 110, it may have, for example, two users who are authorized to edit different pages of the dealership web site. For example, a first user represented by PC 120 might be the manager of the dealership's new car division and who has permission to edit the new car web site (or new car pages) on the dealership web site. A second user represented by PC 122 in FIG. 1 may be authorized to edit the web site (or web pages) pertaining to used car sales. There could be another user, for example, to manage parts sales and inventory (not shown). These users 120, 122 can communicate via network 100 to the application server 102 to view and edit web pages where they have authorization to do so. These users are distinguishes from customers, i.e. the general public, represented by PCs 130,132 who typically will "visit" the dealership web site to obtain information about the dealership's products and services. The customers of course will not have permission to edit any of the web site pages, although they are likely to interact with the web site through form submissions and the like, as is conventional. The web site can also be accessed by a handheld device 134 such as a Palm Pilot, Pocket PC or web-enabled wireless telephone.

FIG. 1 also shows an OEM manufacturer entity 140 which, in our automotive example, could be an auto manufacturer such as Ford Motor Company, Toyota, or Audi. Typically, the dealership or group of dealerships (business entities 110, 112) are affiliated with one or more car manufacturers as "authorized dealers." In this regard, the manufacturer 140 may have occasion to access the application server 102 (via network 100) to provide and update information that can be used by the authorized dealers on their web sites. This might include web site content such as photographs of automobiles which can be stored in the marketing library database 106. Similarly, OEM parts manufacture 142 can provide parts information for use on the web sites of authorized parts dealers, which maybe standalone or a parts department of an automobile dealership. Further, the OEM manufacturers may have permission to access and review a restricted-access prototype or "proof" version of a web site before it is released (goes "live") to the general public. See commonly-owned U.S. patent application entitled, STAGED PUBLICATION AND MANAGEMENT OF DYNAMIC WEBPAGES, filed Jan. 24, 2003 Appl. No. PCT/US04/01802 and hereby incorporated herein by this reference.

The application server in a presently preferred commercial embodiment is built on a J2EE platform, and includes a web site manager that enables the web site proprietor (business entity) and its authorized users to maintain its web site(s). The web site manager preferably is implemented as a web application, in other words the user accesses that functionality on the application server through their standard web browser. This need not necessarily be the case but it is preferred because it obviates the need for the dealership to deploy special software. For greater detail, see commonly-owned U.S. patent application entitled, METHOD AND APPARATUS FOR PROCESSING A DYNAMIC WEBPAGE, filed Jan. 24, 2003 Appl. No. PCT/US04/02100. The web site manager application enables the authorized user to select the web site of interest using a friendly graphical interface, such as that illustrated in FIG. 3.

Figure 3:
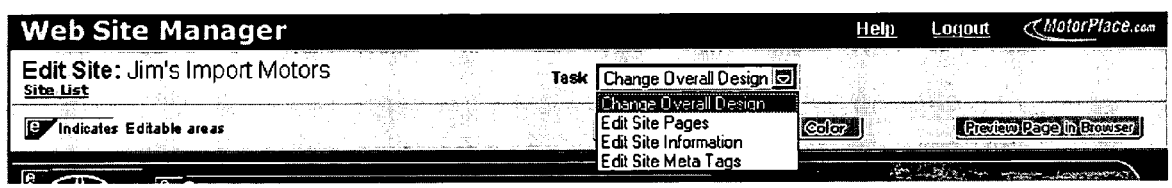
FIG. 3 is an example of a web browser window displaying a web site manager generated page enabling a user to select a web site editing task.

FIG. 3 is a partial screen shot of a web site manager application display in a web browser window enabling a remote business entity (or its authorized user) to edit the entity's web site. In one embodiment of a web site manager, the user is presented with a summary page in which the user can choose to enter edit mode for a particular site by clicking "Edit Site." Choosing this option brings the user to the site's work-in-process ("WIP") state. The WIP version of the website is editable, and is separately stored on the application server from the "live" web site which is the version accessible by the general public. Referring again to FIG. 3, we next assume that the user selects "Change Overall Design." In that task screen the user can make design changes that apply to all pages within the site. As indicated in FIG. 3, the user can preview a selected page in the browser by clicking on that button.

Figure 4:
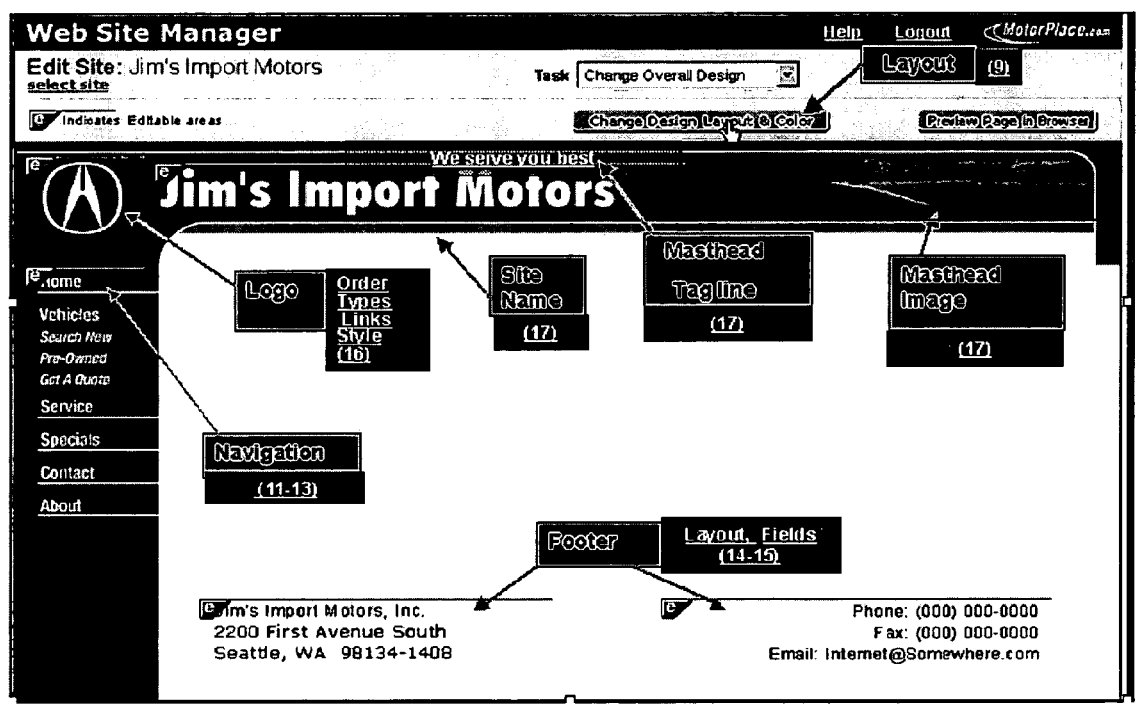
FIG. 4 is an example of a web browser window displaying a web site manager generated screen enabling an authorized user to change the overall design of a web site.

FIG. 4 illustrates an example of a change overall design screen. This screen display comprises two frames, the top one indicating options available to the user ("Change Design Layout & Color", "Preview Page in Browser", etc.). The lower frame displays the selected web page and in this panel certain editable elements are identified by a distinctive icon comprising a lower case "e" and a graphic symbol similar to a truncated button. For example, in FIG. 4, the logo and the site name are indicated as editable areas, whereas the masthead image is not editable. The masthead image is one element that the page designer wishes to maintain consistently over the site.

Figure 5A:
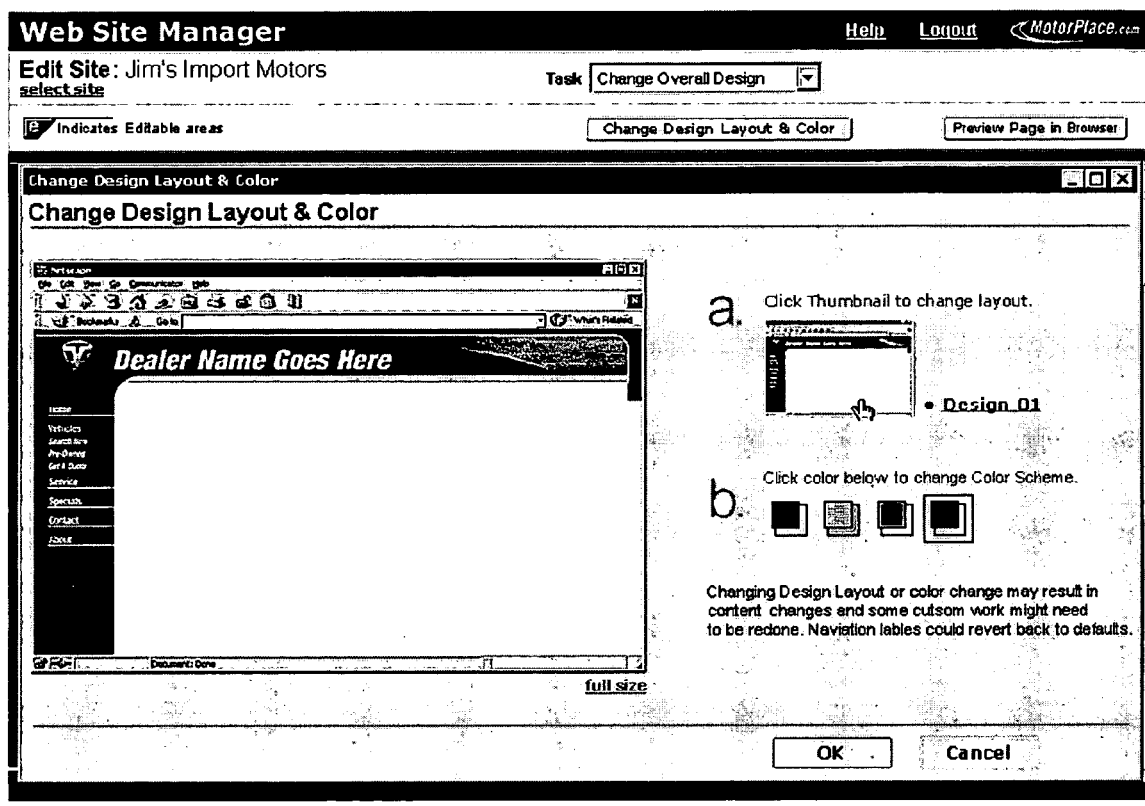
FIG. 5A and FIG. 5B illustrate a web site manager screen enabling a remote user to change the design layout and color scheme of the web site.
Figure 5B:
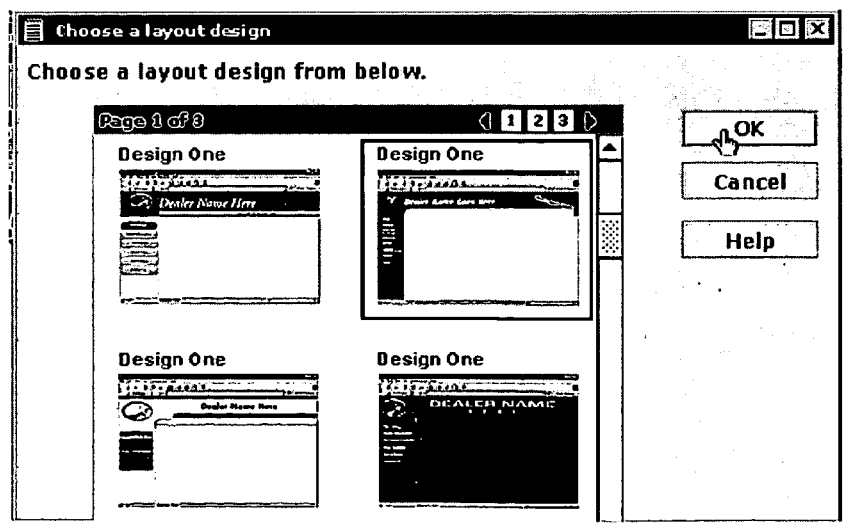

If the user chooses "Change Design Layout & Color", the user is presented with a screen like that shown in FIG. 5A, where he can choose color schemes for the chosen design or select design layouts within the selected design family. FIG. 5B shows a panel for choosing a layout design, each of the available designs being displayed in thumbnail form.

Figure 6:
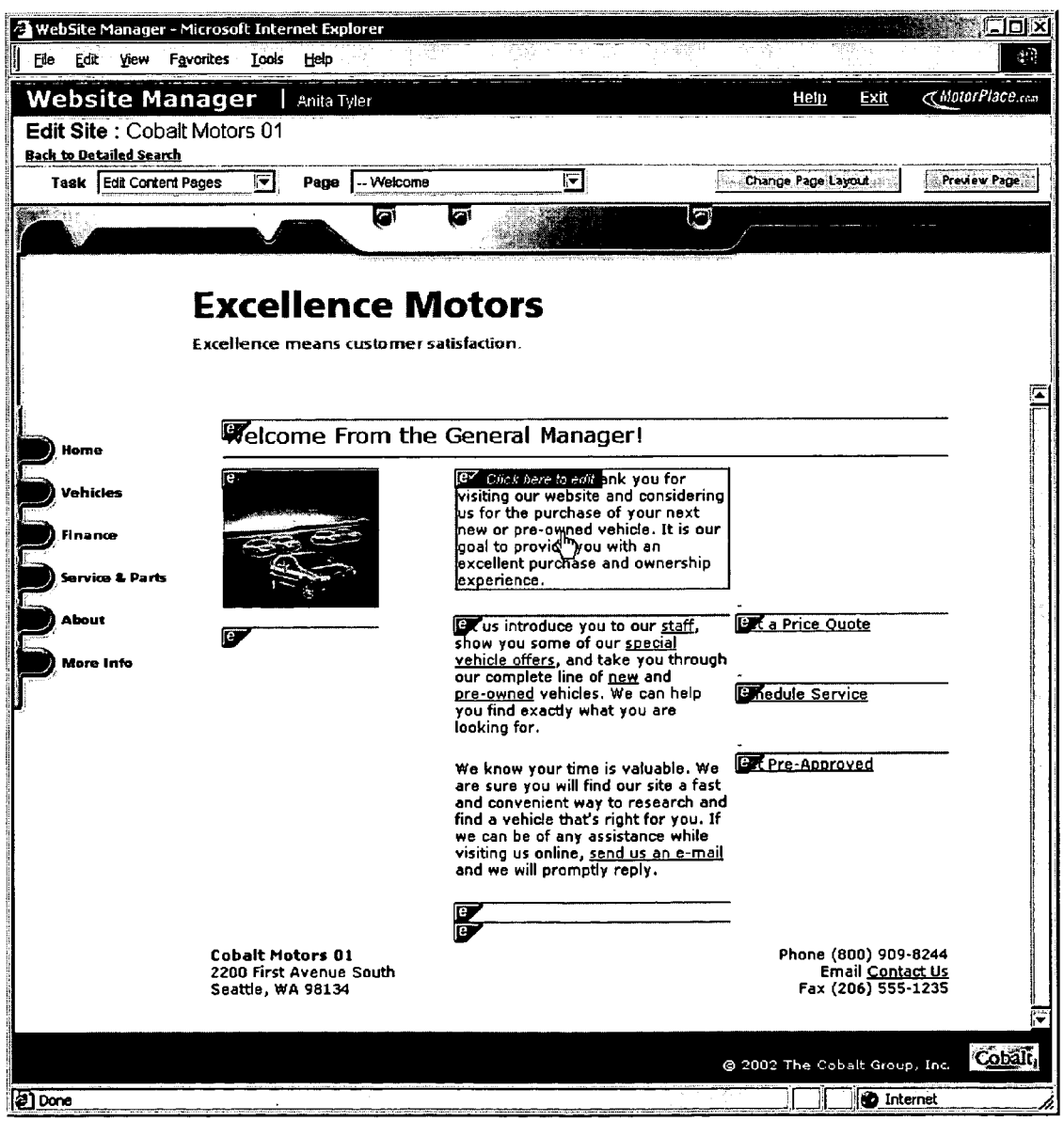
FIG. 6 is an example of a web browser window displaying a web site manager generated screen enabling an authorized user to select a cell for editing.

Next we assume that the user is authorized to do so and has selected an individual page for editing. Referring now to FIG. 6, the title bar at the top indicates that this illustrates a screen display in the Internet Explorer web browser. The next title bar below the top shows that the user is in a session with the web site manager application and the logged-in user ("Anita Tyler") is identified. The top portion of that window ("Edit Site: Cobalt Motors 01") presents the user with various pull-down menus, including an option to edit content pages as shown. In the next panel ("Excellence Motors") a web page from the Excellence Motors dealership is displayed. This is an editable web page as indicated by the edit icons described above. Certain cells of the web page are editable while others are not. For example, the dealership name and address shown at the lower left is not flagged as editable, because it is to remain constant across all pages of the web site. The same is true of the banner "Excellence Motors" near the top of the page. Other cells are editable, as indicated by the icon, including the photograph 620 and the text field 622. In this specification and the appended claims, we refer to a web page "cell" as any content element that can be processed or rendered by a web browser. Examples include text, photographs or other graphic material, movies, audio clips, etc. Continuing our example, note that the text field 622 is surrounded by a boundary box (whereas other text cells are not). This is a consequence of the cursor 624 (a hand) floating over the editable text cell. When the cursor floats over this field, the boundary box appears, and the editable icon expands to display the message "Click Here to Edit" as illustrated.

Figure 7:
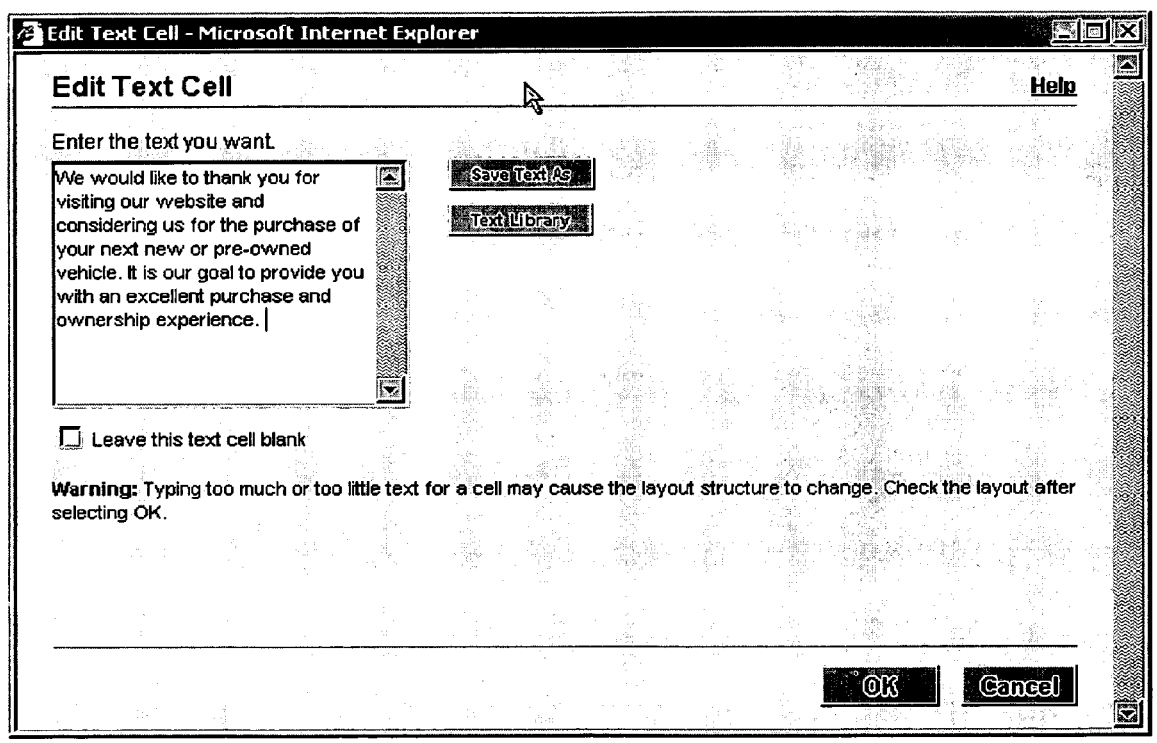
FIG. 7 is an example of a an Edit Text Cell pop-up window.

Next the user clicks on the specified field to edit the text cell 622. When the user chooses to edit the text cell 622, a new window or panel 700 pops up as indicated in FIG. 7. This is just one example of a edit text cell panel. In this simple example, the user is invited to enter the desired text in the field provided. Other features can be implemented in the edit text cell panel, for example providing a choice of font size or style. On the other hand, it is often preferred that the style of the text be constrained to that defined by the page designer so that a consistent and professional appearance is maintained throughout the web pages and the site. Exactly what changes in content and style will be permitted is determined by the layout or template created by the designer. In general, the editing described here is intended for a user who is not a computer programmer or even very familiar with internet technologies.

Figure 8:
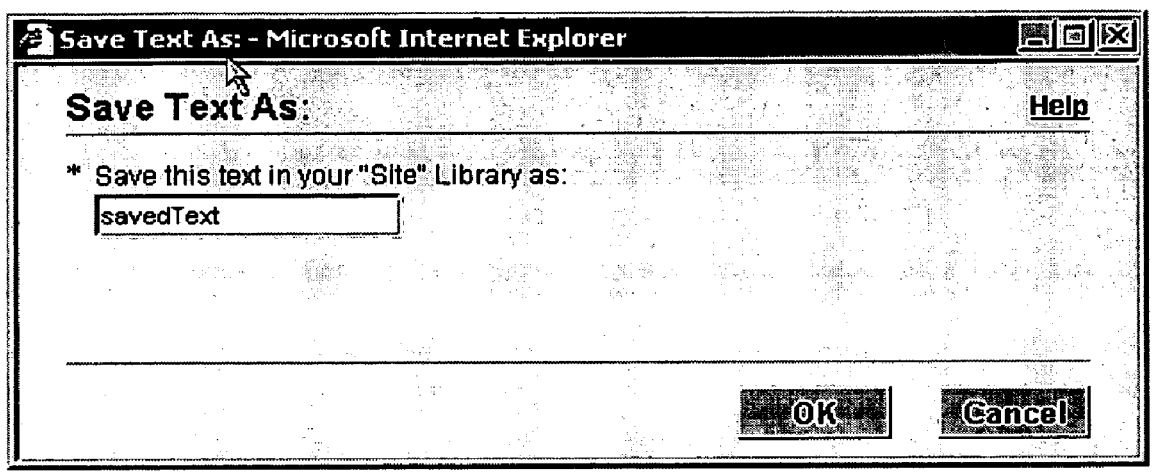
FIG. 8 is an example of a Save Text As pop-up window for saving selected text to a site library.
Figure 9:
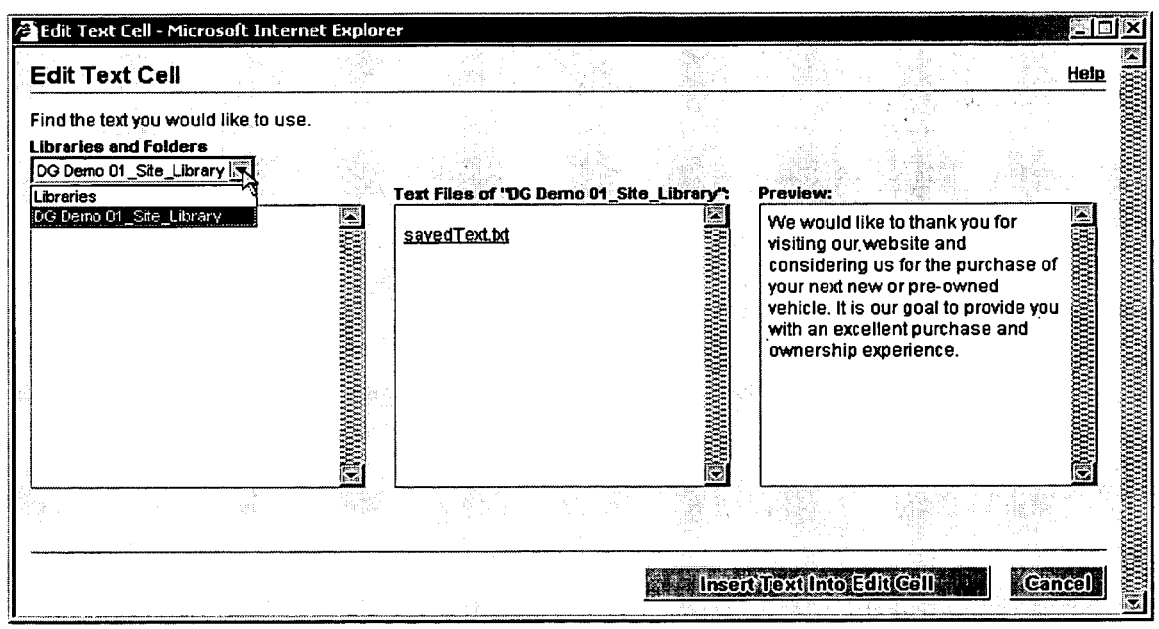
FIG. 9 is an example of a pop-up browsing window for selecting predetermined text from a site library and inserting the text into a cell.

The edit text cell panel 700 includes a field 702 for entering text, as mentioned, in a "save text as" button 706. As shown in FIG. 8, clicking the button 706 activates the "save text as" panel to enable the user to save the text entered in 702 in the site library under a name entered by the user in panel 710. This action will result in saving the text (702) in the associated site library 104 in FIG. 1. Rather than type new text into the panel 702, the user can click "text library" button 710 to access the text library of pre-existing content. Button 710 activates the panel shown in FIG. 9 which enables the user to browse the libraries and folders of existing content and preview it. Once the desired text is selected, the user clicks on button 902 to insert the selected text into the editable cell (622 in FIG. 6).

Figure 10:
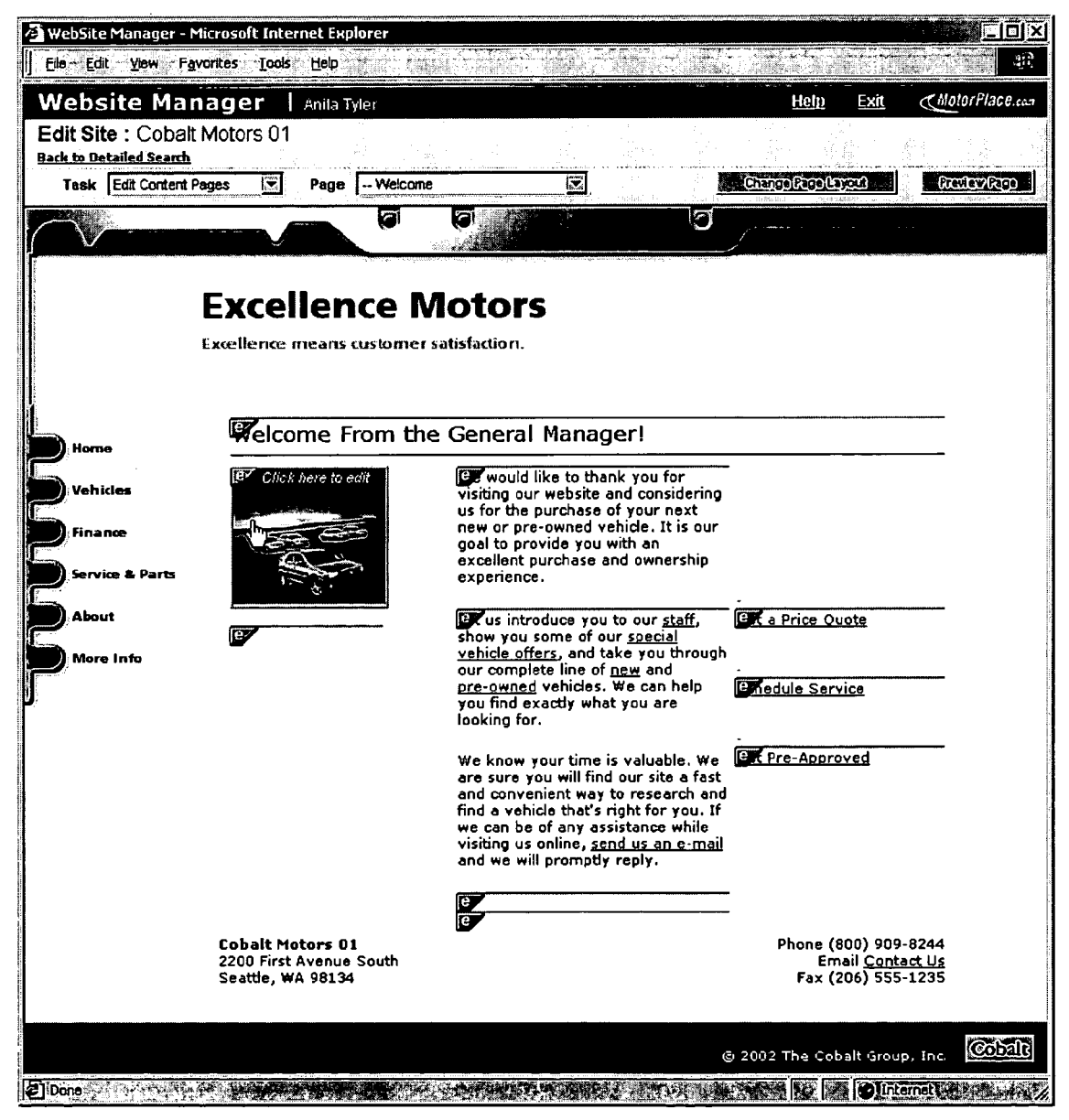
Figure 11:
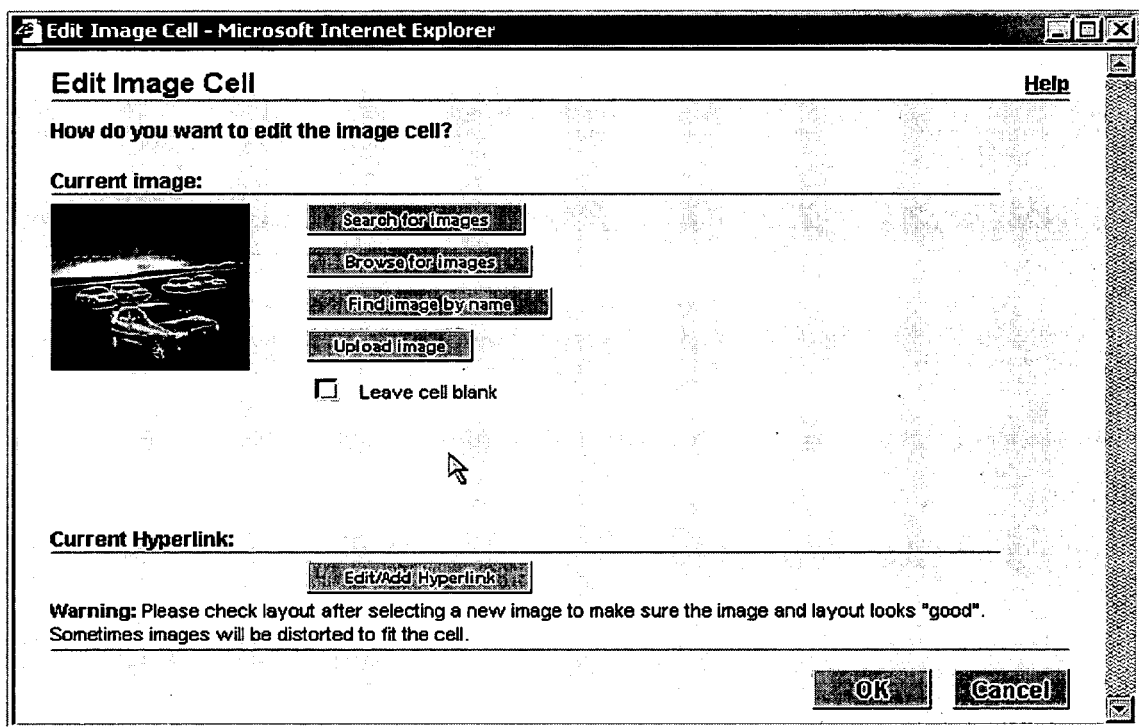
FIG. 11 is an example of a pop-up window for editing an image cell.
Figure 12:
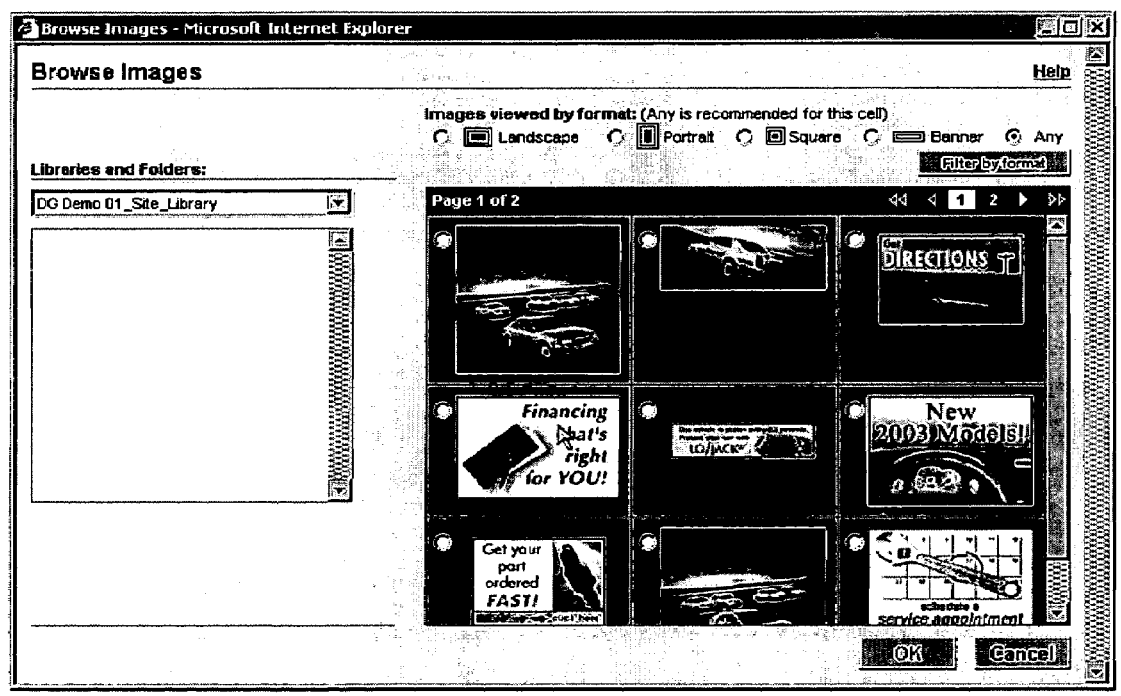
FIG. 12 is an example of a pop-up browsing window for selecting an image from a site library.

Referring now to FIG. 10, the cursor 1010 is now floating over an image cell 1012. As before in the case of a text cell, floating the cursor activates a boundary around the editable cell and the "click here to edit" button 1014. When the user clicks that button, an edit image cell panel pops up as shown in FIG. 11. In this example, the user is presented with options to search for images, browse for images, find an image by name (in the site library) or upload a new image. (Or the user could check the box to leave the cell blank.) If the user chooses to browse images, another panel pops up as illustrated in FIG. 12. This panel enables the user to browse through libraries and folders on the site library as indicated at 1210 and upon selecting a library, a collection of images is displayed (in thumbnails) as indicated as 1212. There may be multiple pages of thumbnail images if they are numerous, and the user can scroll through the images as desired. A simple radio button can be used to select a desired image, for example a radio button 1214. Other illustrative features will be apparent to the reader upon closer inspection of the drawing figures.

When the desired editing step is completed, the user clicks the corresponding "OK" button or the like, and the results are submitted to the server, for example using standard HTTP form submission protocols (again, so a standard web-browser can be used for remote editing without supplemental software). FIG. 2 illustrates the payload of such a submission, in this case a text cell edit. Referring to FIG. 2, the form includes identifiers of the web site, web site version and edited cell, the new text (content) and optionally the old text (prior to editing).

The types of editing activities illustrated in the drawing figures described above can be carried out by the user, in accordance with the present invention, in a standard web browser running on the user's machine, without having to install external software such as JAVA applets or browser plug-ins. This feature is accomplished by enabling the desired editing functionality within the (editable) web page itself, using a markup language. In a presently preferred commercial embodiment, Java Server Page ("JSP") technology is used in the application server to generate the editable page. The editable page employs a standard markup language so that it will execute properly in a standard web browser, such as Microsoft Internet Explorer, Netscape, or the like.

In one illustrative implementation, the JSP code invokes custom tags to implement the editor in HTML and DHTML standard markup languages. To further describe the invention, sample code is shown below for implementing a text cell edit feature. In view of this description of the technical approach taken in a presently preferred embodiment, those skilled in the art will readily appreciate various ways to implement editing of other types of cells, such a pictures or graphics, as well as other equivalent methods and technologies to implement remote editing generally in accordance with the invention, to implement WYSIWYG editor behavior in a standard web browser without requiring additional software. This has the advantage of enabling editing by a user on virtually any PC or other web-enabled device; no special software is needed. Neither is programming expertise necessary as the editing functionality is a visual-editing paradigm with WYSIWYG feedback in essentially real time.

Figure 13:
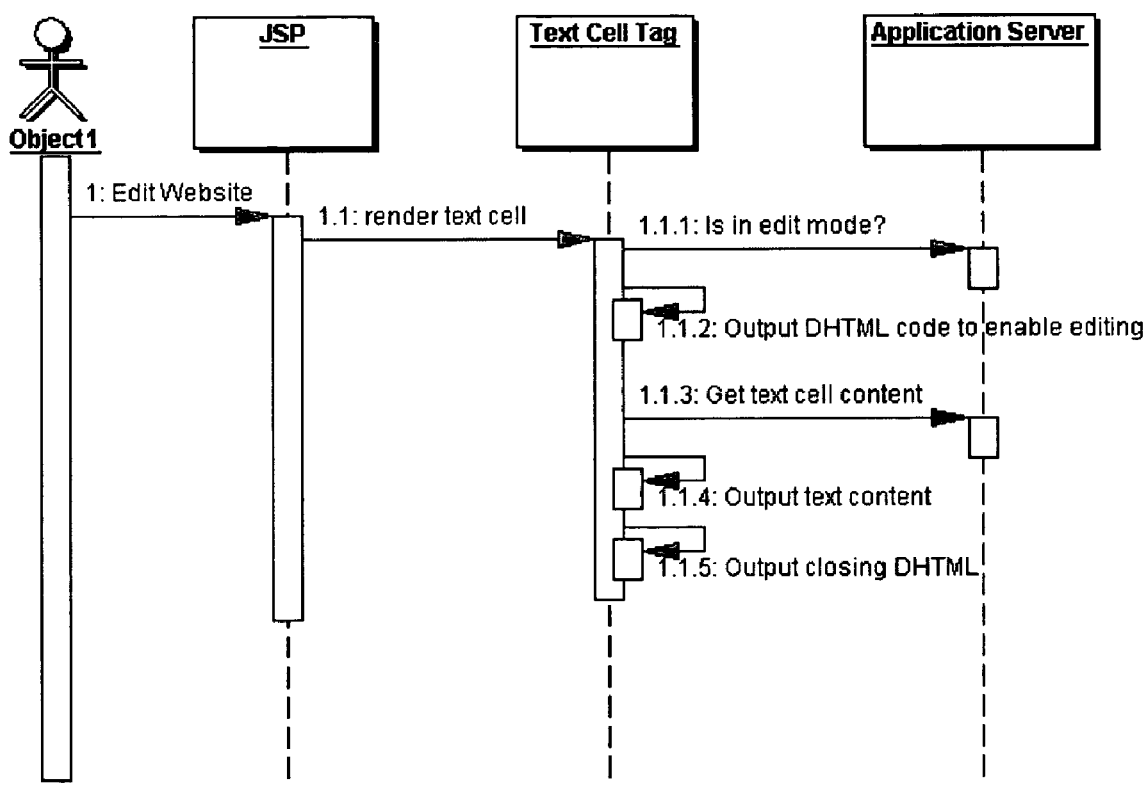
FIG. 13 is a Sequence Diagram illustrating a text cell rendering process.

FIG. 13 is a sequence diagram that summarizes the operations described above. At the left side, the stick figure represents a user operating a web browser who has requested to edit a web site. The edit web site request invokes the JSP at the web server. The JSP in turn executes the text cell tag (or other custom tag, such as a graphic cell tag, as appropriate). The text cell tag logic confirms that the web site is in edit mode by querying the application server and, if so, begins generating HTML/DHTML code to enable editing. The code is output to a buffer where the editable web page is assembled. The text cell tag logic first gets the existing text cell content from the application server, see loadCell( ) method, and adds it to the buffer. The JSP invokes various methods as shown in the illustrative code below to generate the editable page. The editable page could comprise, for example, the HTML DIV tag which defines the editable cell boundaries, highlight behavior, and causes the pop-up windows to appear in the browser in connection with editing the cell as described above.

In the following code example, we assume that a user has logged in to the server platform and has permission to edit the page he selects. The following JSP code creates the HTML that enables editing content at the browser: This is implemented using a custom tag, called text-cell (the text cell editing tag).

The opening tag includes default text for the cell:

```
<CobaltDesign:text-cell cellName="welcome_bodytext1">We would like
to thank you for visiting our website and considering us for the purchase
of your next new or pre-owned vehicle. It is our goal to provide you with
an excellent purchase and ownership experience.</CobaltDesign:text-cell>
```

The code for the tag (text-cell) begins as follows:

```
package com.cobaltgroup.products.webengine.web.tag;
import java.net.URLEncoder;
import javax.servlet.jsp.JspException;
import javax.servlet.jsp.tagext.BodyContent;
import com.cobaltgroup.foundation.exception.CobaltSystemException;
import
com.cobaltgroup.products.webengine.exception.UnknownCellException;
import com.cobaltgroup.products.webengine.vo.SiteContextAdapter;
import com.cobaltgroup.products.webengine.vo.TextCell;
import com.cobaltgroup.products.webengine.vo.WebengineDelegate;
```

Following is standard format commenting:

```
* Tag that inserts text.
*
*   <p>If the site doesn't have custom text for the cell, the text within
*   the body of the tag is shown instead.
*
*   <p>Usage example:
*   <pre>
       <design:text-cell cellName="abbott" maximumLength=
       "50" >
       This default code shows up if there's no custom text
       in the site data.
       </design:text-cell>
       </design:text-cell cellName="costello">
       </design:text-cell>
*   </pre>
*
*   <h4>Tag Parameters:</h4>
*   <p><table border="1" align="center" width="95%" cellpadding=
"3">
*
*   <tr valign=top>
*   <td width=25%><b>cellName</b></td>
*   <td width=20%>required</td>
*   <td>
*   The name of this cell. This MUST be unique with a layout.
*   </td>
*   </tr>
*
*   <tr valign=top>
*   <td width=25%><b>maximumLength</b></td>
*   <td width=20%>optional</td>
*   <td>
*   Limits the number of characters allowed in the text cell.
*   Extra text is truncated.
*   If no value is specified the text length is unlimited.
*   </td>
*   </tr>
*
*   </table></p>
public class TextCellTag extends DesignBodyTag implements
EditableTag {
    public String cellName;
    public String maximumLength;
    private TextCell cell;
    private boolean editable = true;
    private boolean useDefault = false;
    private boolean useCustomText = false;
    private boolean hasCellAlready = false;
    private static final String NO_CELL_FLAG = "none";
    private static final String EDITOR_URL =
        "/websitemanager/ControllerServlet?requestPath=EditTextCell";
    /**
     * Default constructor.
     */
    public TextCellTag( ) {
        super( );
    }
    /**
     * reintialize private variables to null
     */
    public void release( ) {
        super.release( );
        this.cellName = null;
        this.maximumLength = null;
        this.cell = null;
        this.editable = true;
        this.useDefault = false;
        this.useCustomText = false;
        this.hasCellAlready = false;
    }
    public int doStartTag( ){
        context =
            SiteContextAdapter.getInstance(
                pageContext.getRequest( ),
                pageContext.getSession( ));
        webengine = WebengineDelegate.getInstance(context);
        return EVAL_BODY_BUFFERED;
    }
    public void doInitBody( ) {
        loadCell( );
    }
    public int doEndTag( ) throws JspException {
        startRendering( );
        endRendering( );
        return EVAL_PAGE;
    /**
     * Returns the string value of the cellName attribute.
     */
    public String getCellName( ) {
        return this.cellName;
    }
    /**
     * Set the MaximumLength attribute.
     *
```

-continued

```
     * @param maximumLength      the value of maximumLength
     */
    public void setMaximumLength(String maximumLength) {
        this.maximumLength = maximumLength;
    }
    /**
     * Returns the string value of the MaximumLength attribute.
     */
    public String getMaximumLength( )
        return this.maximumLength;
    /**
     * Initializes the tag's cell data.
     */
    private void loadCell( ) {
        try {
            cell = (TextCell) webengine.getCell(getCellName( ));
            if (cell != null) {
                hasCellAlready = true;
                //If cell contains text and isBlank is false then only display the
                // text in cell
                if (cell.getIsBlank( ))
                {
                    useCustomText = false;
                    useDefault = false;
                }
                else if (cell.getText( ).trim( ).length( ) > 0)
                {
                    useCustomText = true;
                } else {
                    useDefault = true;
                }
            } else {
                hasCellAlready = false;
                useDefault = true;
            }
            editable = true;
        } catch (UnknownCellException x) {
            useCustomText = false;
            useDefault = true;
            editable = true;
        } catch (CobaltSystemException x) {
            dealWithProblem (x);
            useCustomText = false;
            useDefault = false;
            editable = false;
        } catch (RuntimeException x) {
            x.printStackTrace( );
            dealWithProblem(x);
            useCustomText = false;
            useDefault = false;
            editable = false;
        }
    /**
     * Returns the text string trimmed to size.
     */
    private String getText( ) {
        String text = cell.getText( );
        try {
            int length = Integer.parseInt(maximumLength);
            return text.substring(0, length);
        } catch (RuntimeException x) {
            return text;
        }
    }
    /**
     * Start rendering the tag into HTML.
     */
    protected int startRendering( ) throws JspException {
//      loadCell( );
        if (editable && shouldWrapInPageEditMode( ))
            startWrapper(this);
        if (useCustomText) {
            printOut(getText( ));
        } else if (useDefault) {
            String defaultText = getDefaultText( );
            //System.out.println("Default Text is:"+ defaultText);
            printOut(defaultText);
        } else {
            printOut(" ");
```

-continued

```
        }
        return 0;
    }
    /**
     * Convenient way to print editor launcher wrapper.
     * It relies on the EditableTag interface.
     * Starts HTML code needed to generate editor launcher.
     *
     * @see com.cobaltgroup.products.webengine.web.tag.EditableTag
     */
    protected void startWrapper(EditableTag eTag) {
        printOut(
            beginEditorWrapper(
                eTag.getLauncherName( ),
                eTag.getLauncherUrl( ),
                eTag.getLauncherSize( ),
                getTipText( )));
        return;
    }
    /**
     * Precedes DesignTag with editor launcher code.
     *
     * Output is of the form:<code><pre>
     * <DIV ID="sectionOuter_a" CLASS="boundingOuterSection"
     * onMouseOver="boundingOn('a');" onMouseOut=
     "boundingOff ('a');"
     * onClick="open popup js goes here">
     * <DIV CLASS="boundingButton" onMouseOver=
     "boundingOn('a');"
     * onMouseOut="boundingOff ('a');" onClick=""><IMG SRC=
     * "/resources/images/edit_off.gif" WIDTH="22" HEIGHT="15"
     * NAME="edit_a" BORDER=0 ></DIV>
     * <DIV ID="tooltip_a" CLASS="boundingTooltip"><P
     CLASS="boundingSmallText">
     * Click here to edit</DIV>
     * <DIV ID="sectionInner_a" CLASS="boundingInnerSection">
     *   <DIV></pre></code>
     */
    public static String beginEditorWrapper   ( String launcherName
                                              , String launcherUrl
                                              , String launcherSize
                                              , String
                                                launcherTooltipText )
    {
        StringBuffer buffer = new StringBuffer( );
        buffer.append("<DIV ID=
            \"sectionOuter_"+launcherName+"\"
            CLASS=\"boundingOuterSection\" "); // +1
        buffer.append("onMouseOver=
            \"boundingOn('"+launcherName+"');\" ");
        buffer.append("onMouseOut=
            \"boundingOff('"+launcherName+"');\" ");
        buffer.append("onClick=
            \"var "+launcherName+" = new
            popupObj('"+launcherUrl+"', '"+launcherSize+"');");
        buffer.append("openWin('"+launcherName+"');\">\n");
        buffer.append("    <DIV CLASS=\"formatWrapper\">\n");
        buffer.append("        <DIV ID=
            \"sneezeguard_"+launcherName+"\"
            CLASS=\"sneezeguard\"><TABLE WIDTH=\"100%\" HEIGHT=
            \"100%\"
            CELLPADDING=\"0\" CELLSPACING=\"0\"
            BORDER=\"0\"><TR><TD> 
            </TD></TR></TABLE></DIV>\n");
        buffer.append("        <DIV CLASS=\"boundingButton\">"); // +2
        buffer.append ("<IMG SRC=\""+ADORN_IMAGE+"\"
            WIDTH=\""+ADORN_WIDTH+"\" HEIGHT=
            \""+ADORN_HEIGHT+"\"
            NAME=\"edit_"+launcherName+"\" BORDER=0 >");
        buffer.append("</DIV>\n"); // -2
        buffer.append("        <DIV ID=\"tooltip_"+launcherName+"\"
            CLASS=\"boundingTooltip\"><P CLASS=\"boundingSmallText\">"+
            launcherTooltipText +"</DIV>\n"); // +-3
        buffer.append("        </DIV>\n");
        buffer.append("
            <SCRIPT>addCellName(\'"+launcherName+"\');</SCRIPT>\n");
        buffer.append("        <DIV ID=
            \"sectionInner_"+launcherName+"\"
            CLASS=\"boundingInnerSection\">\n"); // +4
        buffer.append("            <DIV>\n") ; // +5
```

-continued
```
        return buffer.toString( );
    }    /**
     * Get the default text, whether it exists or not.
     */
    private String getDefaultText( ){
        BodyContent content = getBodyContent( );
        String value = "";
        if (null != content){
            value = content.getString( );
        }
        return value;
    /**
     * Finish rendering the tag into HTML.
     */
    protected int endRendering( ) throws JspException {
        if (editable && shouldWrapInPageEditMode( ))
            endWrapper(this);
        return EVAL_PAGE;
    }
    /**
     * Convenient way to print editor launcher wrapper.
     * It relies on the EditableTag interface.
     * Completes HTML code needed to generate editor launcher.
     *
     * @see com.cobaltgroup.products.webengine.web.tag.EditableTag
     */
    protected void endWrapper(EditableTag eTag) {
        printOut(finishEditorWrapper( ));
        return;
    /**
     * Follows DesignTag with editor launcher code.
     */
    public static String finishEditorWrapper ( )
    {
        return "\n        </DIV>\n    </DIV>\n</DIV>\n";
        // −5 −2 −1
    }
    /**
```

-continued
```
     * Returns the editor url as a string.
     */
    public String getLauncherUrl( ) {
        StringBuffer buffer = new StringBuffer( );
        buffer.append(EDITOR_URL);
        buffer.append("&" + SiteContextAdapter.CELL_NAME +
"=");
        buffer.append(getCellName( ));
        buffer.append("&" + SiteContextAdapter.CELL_ID + "=");
        if (hasCellAlready) {
            buffer.append(cell.getId( ).toHexString( ));
        } else {
            buffer.append(NO_CELL_FLAG);
buffer.append("&defaultText="+URLEncoder.encode(getDefaultText( )));
        }
        return buffer.toString( );
    }
    /**
     * Returns the name of the window size of the editor launcher.
     */
    public String getLauncherSize( ) {
        return SIZE_SMALL;
    }
    /**
     * Returns the name of the editor launcher.
     */
    public String getLauncherName( ) {
        return getCellName( );
// this should be unique for each page} // TextCellTag
```

Below is the resulting HTML that denotes the text cell at the browser. The initial DHTML "DIV" tag creates the bounding box that is displayed on the browser—see 622 in FIG. 6. When the user clicks on the box, as described above, it opens a new browser window based on the parameter in the popupObj( ) method call.

```
<DIV ID="sectionOuter_welcome_bodytext1" CLASS="boundingOuterSection"
onMouseOver="boundingOn('welcome_bodytext1');"
onMouseOut="boundingOff('welcome_bodytext1');" onClick="var
welcome_bodytext1 = new
popupObj('/websitemanager/ControllerServlet?requestPath=EditTextCell&cellNa
me=welcome_bodytext1&cellId=none&defaultText=We+would+like+to+thank+you+for
+visiting+our+website+and+considering+us+for+the+purchase+of+your+next+new+
or+pre-
owned+vehicle.++It+is+our+goal+to+provide+you+with+an+excellent+purchase+an
d+ownership+experience.','sml');openWin(welcome_bodytext1);">
        <DIV CLASS="formatWrapper">
            <DIV ID="sneezeguard_welcome_bodytext1" CLASS="sneezeguard"><TABLE
WIDTH="100%" HEIGHT="100%" CELLPADDING="0" CELLSPACING="0"
BORDER="0"><TR><TD> </TD></TR></TABLE></DIV>
            <DIV CLASS="boundingButton"><IMG
SRC="/resources/images/edit_off.gif" WIDTH="22" HEIGHT="15"
NAME="edit_welcome_bodytext1" BORDER=0 ></DIV>
            <DIV ID="tooltip_welcome_bodytext1" CLASS="boundingTooltip"><P
CLASS="boundingSmallText">Click here to edit</DIV>
    </DIV>
    <SCRIPT>addCellName("welcome_bodytext1");</SCRIPT>
    <DIV ID="sectionInner_welcome_bodytext1" CLASS="boundingInnerSection">
        <DIV>
```

We would like to thank you for visiting our website and considering us for the purchase of your next new or pre-owned vehicle. It is our goal to provide you with an excellent purchase and ownership experience.

---
</DIV>
</DIV>
</DIV>
---

The same tag also creates the following HTML when it is invoked with editing turned off(published):

We would like to thank you for visiting our website and considering us for the purchase of your next new or pre-owned vehicle. It is our goal to provide you with an excellent purchase and ownership experience.

It will be obvious to those having skill in the art that many changes may be made to the details of the above-described embodiments without departing from the underlying principles of the invention. The scope of the present invention should, therefore, be determined only by the following claims.

The invention claimed is:

1. A visual, WYSIWYG method of editing a web page in a user's client web browser without employing any external code on the user's computer, comprising:
   in a web page, designating at least one of a plurality of locally editable features, wherein one of said plurality of locally editable features is a web page layout feature and one of said plurality of locally editable features is web page content feature;
   responsive to a request from the user's client web browser to edit the web page:
      transmitting an editable web page to the user's client web browser without generating an executable code on a server associated with the downloaded web page, wherein editing said web page in the user's web browser is carried out without the use of additional software on the web browser;
      receiving a submission from the web browser that includes an identifier of the web page edited, an identifier of an editable feature, and indicia of a new value of the identified editable feature;
      updating the web page stored on the server to incorporate the indicated new value of the identified editable feature; and
      transmitting an updated web page to the user's web browser.

2. A method according to claim 1, wherein the submission from the web browser includes an identifier of a web site and a version of the web site.

3. A method according to claim 1, wherein the editable web page has embedded editing logic for at least one of the editable features and editing the web page locally includes executing the embedded editing logic by the user's client web browser.

4. A method according to claim 3, wherein the execution of the embedded editing logic by the user's client web browser does not send a request to the server.

5. A method according to claim 1, wherein the submission from the web browser includes a new color scheme value site and the method further includes updating the entire web site to reflect the new color scheme value.

6. A method according to claim 1, wherein the submission from the web browser includes a new layout design for the web site and the method further includes updating the entire web site to reflect the selected layout design.

7. A method according to claim 1, wherein said downloading a web page of the requested web site to the browser in an editable form includes embedding a plurality of thumbnail images illustrating alternative layout designs for the web page.

8. A method according to claim 1, wherein the new value for the identified editable feature comprises new text.

9. A method according to claim 1, wherein the indicia of a new value for the identified editable feature comprises an identifier of a new image file.

10. A method according to claim 1, wherein the submission is transmitted to the web server as a Hyper Text Transfer Protocol POST.

11. A computer-readable storage media comprising instructions to cause the computing device to perform a method of editing a web page of a web site, the method comprising:
   generating, at a server, an editable web page comprising embedded editing logic for editing at least one of a plurality of editable features of the web page, wherein one of the plurality of editable features is a web page layout feature and one of the editable features is web page content feature, and wherein the embedded editing logic is executable by a web browser to enable local editing of the web page without executing additional software on the web browser and without communicating with the server;
   receiving a form payload submission from the web browser, the form payload submission including an identifier of the web site, a version of the web site, an identifier of the web page edited, an identifier of the editable feature, and indicia of a new value of the editable feature;
   updating the web page, incorporating the new value of the identified editable feature, on the server; and
   sending the updated web page to the web browser for re-rendering.

12. The computer-readable storage media according to claim 11, wherein the local editing of the web page is performed on a computer.

13. The computer-readable storage media according to claim 11, wherein the local editing of the web page is performed on a server.

14. The computer-readable storage media according to claim 11, wherein the local editing of the web page is performed on a handheld device.

15. The computer-readable storage media according to claim 14, wherein the handheld device is a cellular telephone.

16. The computer-readable storage media according to claim 11, wherein the editable feature includes a master template, the master template being capable of updating a plurality of web pages.

17. The computer-readable storage media according to claim 11, wherein the embedded editing logic generates an editing icon for each editable feature when executed by the browser.

18. The computer-readable storage media according to claim 11, wherein the embedded editing logic generates an editing window when executed by the browser, the editing window being operable to capture changes to the editable feature.

19. The computer-readable storage media according to claim 11, wherein the editable web page is part of a web site.

20. The computer-readable storage media according to claim 16, wherein the plurality of web pages capable of being updated are part of a web site.

* * * * *

UNITED STATES PATENT AND TRADEMARK OFFICE
CERTIFICATE OF CORRECTION

PATENT NO. : 7,624,342 B2  Page 1 of 1
APPLICATION NO. : 11/149909
DATED : November 24, 2009
INVENTOR(S) : Wade A. Matveyenko et al.

It is certified that error appears in the above-identified patent and that said Letters Patent is hereby corrected as shown below:

Column 1, Line 36 reads, "Web sites comprises one or more..." which should read, "Web sites comprise one or more..."

Column 1, Line 43 reads, "...sophisticated sites, requires appropriate software..." which should read, "...sophisticated sites, require appropriate software..."

Column 1, Line 67 reads, "...such an a code window..." which should read, "...such as a code window..."

Column 2, Line 30 reads, "A second class of web site (or page) editor..." which should read, "A second class of web site (or page) editors..."

Column 4, Line 5 reads, "These users are distinguishes from..." which should read, "These users are distinguished from..."

Column 4, Line 60 reads, "...process ("WIP" state." which should read, "...process "WIP" state."

Column 6, Line 61 reads, "...other types of cells, such a pictures..." which should read, "...other types of cells, such as pictures..."

Column 7, Line 19 reads, "...defines the editable cell boundaries, highlight behavior..." which should read, "...defines the editable cell boundaries, highlights behavior..."

Column 9, Line 64 reads, "//System.out.printIn..." which should read, "//System.out.println..."

Column 13, Line 30 reads, "...of locally editable features is web page content feature;" which should read, "...of locally editable features is a web page content feature;"

Column 14, Line 22 reads, "...one of the editable features is web page content feature..." which should read, "...one of the editable features is a web page content feature..."

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,624,342 B2 Page 1 of 1
APPLICATION NO. : 11/149909
DATED : November 24, 2009
INVENTOR(S) : Matveyenko et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1082 days.

Signed and Sealed this

Twenty-sixth Day of October, 2010

David J. Kappos
*Director of the United States Patent and Trademark Office*